United States Patent
Zhao

(10) Patent No.: US 11,405,947 B2
(45) Date of Patent: Aug. 2, 2022

(54) METHOD AND TERMINAL FOR PERFORMING SCHEDULING REQUEST

(71) Applicant: China Academy of Telecommunications Technology, Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 66 days.

(21) Appl. No.: 16/958,386

(22) PCT Filed: Sep. 10, 2018

(86) PCT No.: PCT/CN2018/104898
§ 371 (c)(1),
(2) Date: Jun. 26, 2020

(87) PCT Pub. No.: WO2019/128308
PCT Pub. Date: Jul. 4, 2019

(65) Prior Publication Data
US 2021/0058957 A1  Feb. 25, 2021

(30) Foreign Application Priority Data
Dec. 28, 2017 (CN) .......................... 201711466570.X

(51) Int. Cl.
*H04W 72/12* (2009.01)
*H04W 28/02* (2009.01)
(Continued)

(52) U.S. Cl.
CPC ... *H04W 72/1284* (2013.01); *H04W 28/0278* (2013.01); *H04W 72/0453* (2013.01); *H04W 72/1257* (2013.01); *H04W 74/0833* (2013.01)

(58) Field of Classification Search
None
See application file for complete search history.

(56) References Cited

U.S. PATENT DOCUMENTS

2016/0157256 A1* 6/2016 Tseng ................ H04W 28/0278
370/329
2016/0205681 A1* 7/2016 Kim ........................ H04L 5/001
370/329
(Continued)

FOREIGN PATENT DOCUMENTS

CN  101841919 A  9/2010
CN  103535099 A  1/2014
(Continued)

OTHER PUBLICATIONS

Huawei et al.: "SR triggering and cancellation", 3GPP, R2-1706986, SR Triggering and Cancellation, 3rd Generation Partnership Project (3GPP), Mobile Competence Centre; 650, Route Des Lucioles, F-06921 Sophia-Antipolis Cedex, France, vol. RAN WG2, no. Qingdao, China, Jun. 27, 2017-Jun. 29, 2017, Jun. 26, 2017 (Jun. 26, 2017), XP051301483, Retrieved from the Internet: URL:http://www.3gpp.org/ftp/Meetings 3GPPSYNC/RAN2/Docs/ [retrieved on Jun. 26, 2017].

(Continued)

Primary Examiner — Jenkey Van
(74) Attorney, Agent, or Firm — Foley & Lardner LLP

(57) ABSTRACT

Embodiments of the present application relate to a method and a terminal for performing a scheduling request (SR). The method includes: determining, by a terminal, that a band width part (BWP) changes during a process of reporting the SR; and performing, by the terminal, the SR according to an SR configuration on the changed BWP.

12 Claims, 3 Drawing Sheets

(51) Int. Cl.
*H04W 72/04* (2009.01)
*H04W 74/08* (2009.01)

(56) References Cited

U.S. PATENT DOCUMENTS

| | | | |
|---|---|---|---|
| 2017/0142749 A1 | 5/2017 | Kim et al. | |
| 2017/0288769 A1 | 10/2017 | Miller et al. | |
| 2019/0132857 A1* | 5/2019 | Babaei | H04W 72/042 |
| 2019/0166529 A1* | 5/2019 | Chen | H04L 5/0053 |
| 2020/0029351 A1* | 1/2020 | Xiang | H04L 5/0053 |
| 2020/0196327 A1* | 6/2020 | Zhang | H04W 28/0268 |
| 2020/0245395 A1* | 7/2020 | Zhang | H04L 5/0053 |
| 2020/0274676 A1* | 8/2020 | Liu | H04L 5/001 |
| 2020/0314869 A1* | 10/2020 | Xu | H04W 72/0406 |
| 2021/0167930 A1* | 6/2021 | Jeon | H04L 5/0094 |
| 2022/0053534 A1* | 2/2022 | Deogun | H04W 72/1257 |

FOREIGN PATENT DOCUMENTS

| | | |
|---|---|---|
| CN | 104885502 A | 9/2015 |
| CN | 106507491 A | 3/2017 |
| CN | 107396386 A | 11/2017 |
| JP | 2015-039215 A | 2/2015 |

OTHER PUBLICATIONS

ZTE Corporation: "Consideration on the autonomous BWP switch", 3GPP, R2-1712433, Consideration on the UE Autonomous BWP Switch, 3rd Generation Partnership Project (3GPP), Mobile Competence Centre, 650, Route Des Lucioles, F-06921 Sophia-Antipolis Cedex, F, vol. RAN WG2, no. Reno, USA; Nov. 27, 2017-Dec. 1, 2017, Nov. 16, 2017 (Nov. 16, 2017), XP051370989, Retrieved from the Internet: URL:http://www.3gpp.org/ftp/tsg%5Fran/WG2%5FRL2/TSGR2%5F100/Docs/ [retrieved on Nov. 16, 2017].

Catt. "SR Configuration, Mapping and Transmission for CA and BWPs Cases" 3GPP TSG-RAN WG2 #99bis, Oct. 9-13, 2017, pp. 1-4, R2-1710296, Prague, Czech Republic.

Catt. "Further Details on the SR Procedure" 3GPP TSG-RAN WG2 #99bis, Oct. 9-13, 2017, pp. 1-3, R2-1710295, Prague, Czech Republic.

Samsung Electronics R&D Institute UK "On LCH-to-SR-configuration mapping within the multi-BWP framework" 3GPP TSG-RAN WG2 #99-Bis, Oct. 9-13, 2017, pp. 1-4, R2-1710341, Prague, Czech Republic.

3GPP TS 38.321. "Technical Specification Group Radio Access Network; NR; Medium Access Control (MAC) protocol specification (Release 15)", Dec. 2017, pp. 1-55, V2.0.0, Sophia Antipolis Valbonne—France.

* cited by examiner

METHOD AND TERMINAL FOR PERFORMING SCHEDULING REQUEST

The application is a US National Stage of International Application No. PCT/CN2018/104898, filed on Sep. 10, 2018, which claims the priority of the Chinese patent application filed on Dec. 28, 2017 in the China National Intellectual Property Administration with the application number 201711466570.X and titled "Method and Apparatus for Performing Scheduling Request", of which the entire contents are incorporated by reference in the application.

FIELD

The application relates to the technical field of wireless communication, in particular to a method and a terminal for performing a scheduling request.

BACKGROUND

In a traditional LTE (Long Term Evolution) system, a cell bandwidth from the perspective of a network side is less than or equal to a terminal reception bandwidth of 20 MHz, thus, the network side always configures a total uplink and downlink bandwidth of a cell to a terminal, and the terminal can work on the entire cell bandwidth. In an NR (New Radio) system, the bandwidth on the network side can be as high as 400 MHz, which is much greater than the receiving capability of the terminal. Therefore, a concept of BWP (Band Width Part) is introduced, that is, the large bandwidth on the network side is divided into multiple BWPs, the one or more BWPs are configured to the terminal, part of the configured BWPs are activated for the terminal to perform uplink and downlink transmission. The activated downlink BWPs are called active DL BWPs, and the activated uplink BWPs are called active UL BWPs. In a R15 version, only one DL BWP and one UL BWP can be activated at a time for the terminal, and the inactive BWPs cannot be used to perform uplink and downlink signaling and data transmission.

After configuring the multiple BWPs for the terminal on the network side, physical layer signaling DCI (Downlink Control Information) can be used for changing the activated BWPs, and the uplink and downlink activated BWPs can be changed separately.

A 3GPP (3rd Generation Partnership Project) wireless communication system is a scheduling-based system, a base station allocates time-frequency resources required for data transmission to terminal apparatus, and the terminal performs downlink data reception or uplink data transmission according to scheduling commands of the base station. The uplink data transmission is scheduled by the base station, and a base station scheduler will notify the terminal through UL grant (uplink scheduling grant) after determining uplink resource allocation. The base station scheduler performs uplink resource allocation based on an uplink data volume to be transmitted by the terminal, namely a buffer state of the terminal. The buffer exists on the terminal side, and if the base station wants to obtain the information, the terminal needs to perform a BSR (Buffer state report) to the base station.

After triggering an SR (scheduling request), there are two ways to transmit the SR, namely: transmitting the SR (D-SR) through dedicated scheduling request resources and performing the SR (RA-SR) through a random access process.

During the process of performing an SR by the terminal, if the terminal is configured to change the BWP by the network side, there is currently no solution for how to handle the ongoing SR process.

SUMMARY

The present application provides a method and a terminal for performing a scheduling request, to solve the problem that if a terminal is configured to change a BWP by a network side, there is currently no solution for how to handle an ongoing SR process in the prior art.

A method for performing a SR according to an embodiment of the present application includes:

determining, by a terminal, that a BWP changes during a process of reporting the SR; and performing, by the terminal, the SR according to an SR configuration on the changed BWP.

A terminal for performing a SR according to an embodiment of the present application includes: a processor, a memory and a transceiver;

the processor is configured to read a program in the memory and perform following processes:

determining that a BWP changes during a process of reporting the SR; and performing the SR according to an SR configuration on the changed BWP.

Another terminal for performing a SR according to an embodiment of the present application includes:

a changing processing module, configured to determine that a BWP changes during a process of reporting the SR; and a reporting processing module, configured to perform the SR according to an SR configuration on the changed BWP.

A computer storage medium according to an embodiment of the present application has a computer program stored thereon, and when the program is executed by a processor, steps of the foregoing method for performing a SR are implemented.

According to the embodiments of the present application, if the terminal determines that the BWP needs to change during the process of performing the SR, the terminal performs the SR according to the SR configuration on the changed BWP. Since the terminal can perform the SR according to the SR configuration on the changed BWP, a processing method of the terminal for the ongoing SR process after the BWP changes is provided; and performance of a system is further improved.

BRIEF DESCRIPTION OF THE DRAWINGS

In order to more clearly illustrate the technical solutions in the embodiments of the present application, the drawings required in the description of the embodiments are briefly introduced below. Obviously, the drawings in the following description are only some embodiments of the present application. Those of ordinary skilled in the art can obtain other drawings based on these drawings without creative labor.

DETAILED DESCRIPTION OF THE EMBODIMENTS

Some terms in the embodiments of the present application will be explained below to facilitate understanding by those skilled in the art.

(1) In the embodiments of the present application, the terms "network" and "system" are often used interchangeably, but those skilled in the art can understand the meaning.

(2) In the embodiments of the present application, the term "plurality" refers to two or more, and other quantifiers are adopted similarly.

(3) "and/or" describing the relationship of related objects indicates that there may be three kinds of relationship, for example, A and/or B may indicate: A exists alone, A and B exist at the same time, and B exists alone. The character "/" generally indicates that the related objects are in a "or" relationship.

In order to make the objective, technical solutions and advantages of the present application clearer, the present application will be further described in detail below with reference to the accompanying drawings. Obviously, the described embodiments are only a part of the embodiments of the present application, not all the embodiments. Based on the embodiments in the present application, all other embodiments obtained by those of ordinary skill in the art without creative efforts fall within the scope of protection of the present application.

Figure 1:
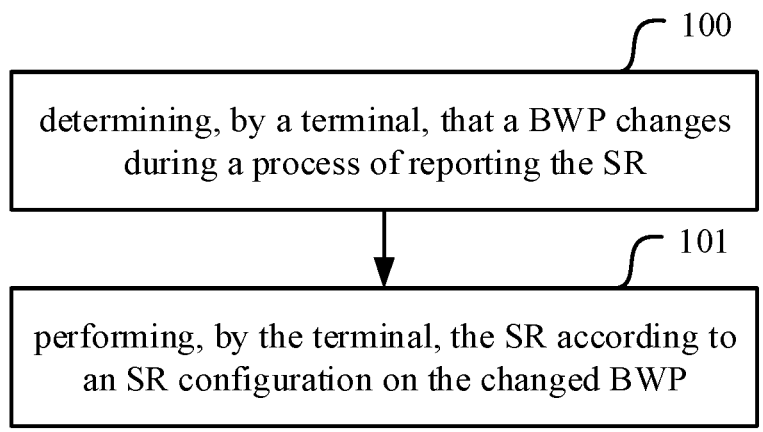
FIG. 1 illustrates a schematic flow diagram of a method for performing a SR according to an embodiment of the present application.

As shown in FIG. 1, a method for performing a scheduling request in the embodiment of the present application includes:

step 100: determining, by a terminal, that a BWP changes during a process of reporting the SR; and step 101: performing, by the terminal, the SR according to an SR configuration on the changed BWP.

According to the embodiment of the present application, if the terminal determines that the BWP needs to change during the process of performing the SR, the terminal performs the SR according to the SR configuration on the changed BWP. Since the terminal can perform the SR according to the SR configuration on the changed BWP, a processing method of the terminal for the ongoing SR process after the BWP changes is provided; and performance of a system is further improved.

According to the embodiment of the present application, the terminal performs the SR according to the SR configuration on the changed BWP in two modes: 1. a logical channel triggering the SR does not have a dedicated SR configuration on the changed BWP; and 2. a logical channel triggering the SR has a dedicated SR configuration on the changed BWP. The two modes are introduced separately below.

Mode 1. a logical channel triggering the SR does not have a dedicated SR configuration on the changed BWP.

Specifically, if the logical channel triggering the SR does not have a dedicated SR configuration on the changed BWP, the terminal performs the SR through a random access process (namely RA-SR).

For mode 1, there may be two cases:

Case 1. the logical channel triggering the SR has a dedicated SR configuration on a BWP used before BWP switching, and the logical channel triggering the SR does not have the dedicated SR configuration on the changed BWP;

Case 2: the logical channel triggering the SR does not have a dedicated SR configuration on a BWP used before BWP switching, and the logical channel triggering the SR also does not have the dedicated SR configuration on the changed BWP.

The cases are explained separately below.

Case 1. the logical channel triggering the SR has a dedicated SR configuration on a BWP used before BWP switching, and the logical channel triggering the SR does not have the dedicated SR configuration on the changed BWP.

For case 1, the terminal can perform the SR through a random access process in one of following ways:

1. if at least one SR prohibit timer of the terminal is running, after a target SR prohibit timer (sr-Prohibit Timer) in the running SR prohibit timers expires, the terminal performs the SR through the random access process on the changed BWP and cancels all of suspended SRs.

It is possible that the terminal currently has multiple suspended SRs, and each suspended SR is provided with multiple SR prohibit timers. In the embodiment of the present application, after the target SR prohibit timer expires, the SR is performed through the random access process on the changed BWP.

Optionally, the target SR prohibit timer here is a first expired SR prohibit timer or a last expired SR prohibit timer.

For example, the terminal may perform the SR through the random access process on the changed BWP after the first expired SR prohibit timer in the running SR prohibit timers expires; and For another example, the terminal may perform the SR through the random access process on the changed BWP after the last expired SR prohibit timer in the running SR prohibit timers expires.

Optionally, if at least one SR prohibit timer of the terminal is running, the terminal stops all of SR prohibit timers and sets SR counters corresponding to the at least one SR prohibit timer to a preset value (SR_COUNTER), for instance, an SR count value is set to 0.

2. after receiving a command for switching a BWP, the terminal immediately stops all of currently running SR prohibit timers, performs the SR through the random access process on the changed BWP, cancels all of suspended SRs and sets an SR count value to a preset value, for instance, an SR count value is set to 0.

It is possible that the terminal currently has multiple suspended SRs, and each suspended SR is provided with multiple SR prohibit timers. In the embodiment of the present application, after receiving the command for switching the BWP, all of the running SR prohibit timers are stopped, and the SR is performed through the random access process on the changed BWP.

3. After receiving a command for switching a BWP, the terminal immediately stops all of currently running SR prohibit timers, sets SR counters related to the SR prohibit timers to a preset value, performs the SR through the random access process on the changed BWP and cancels all of suspended SRs.

It is possible that the terminal currently has multiple suspended SRs, and each suspended SR is provided with multiple SR prohibit timers. In the embodiment of the present application, after receiving the command for switching the BWP, all of running SR prohibit timers are stopped, the SR counters related to the SR prohibit timers are set to the preset value, and the SR is performed through the random access process on the changed BWP.

Case 2: the logical channel triggering the SR does not have a dedicated SR configuration on a BWP used before BWP switching, and the logical channel triggering the SR also does not have the dedicated SR configuration on the changed BWP.

For case 2, the terminal can perform the SR through a random access process in one of following ways:

1. the terminal does not change the BWP, continues to perform the SR through the random access process on a BWP used before BWP switching, and then changes the BWP after random access succeeds.

According to the embodiment of the present application, the terminal does not switch the BWP after receiving a command for switching a BWP, but continues to perform the SR through the random access process on the unchanged BWP.

2. the terminal does not change the BWP, continues to perform the SR through the random access process on the BWP used before BWP switching, changes the BWPs after the $N^{th}$ random access fails, and continues to perform the SR through the random access process on the changed BWP, where N is not greater than a maximum transmitting time of random access.

According to the embodiment of the present application, the terminal does not switch the BWP after receiving a command for switching a BWP, but continues to perform the SR through the random access process on the BWP used before BWP switching, and changes the BWP after the $N^{th}$ random access fails.

The value of N can be set as required herein. For example, the value can be set to 1, as long as the first random access fails before the BWP changes, the BWP is switched, and the SR is performed on the changed BWP through a dedicated scheduling request resource.

3. the terminal immediately stops performing the SR through the random access process on the BWP used before BWP switching, changes the BWP and performs the SR through the random access process on the changed BWP.

According to the embodiment of the present application, the terminal immediately stops performing the SR through the random access process after receiving a command for switching a BWP, changes the BWP and performs the SR through the random access process on the changed BWP.

Mode 2: A logical channel triggering the SR has a dedicated SR configuration on the changed BWP.

Specifically, if a logical channel triggering the SR has a dedicated SR configuration on the changed BWP, the terminal performs the SR through a random access process or performs the SR through a dedicated scheduling request resource.

For mode 2, there may be two cases:

Case 1. the logical channel triggering the SR has a dedicated SR configuration on a BWP used before BWP switching, and the logical channel triggering the SR has a dedicated SR configuration on the changed BWP.

Case 2: the logical channel triggering the SR does not have a dedicated SR configuration on a BWP used before BWP switching, and the logical channel triggering the SR has a dedicated SR configuration on the changed BWP.

The cases are explained separately below.

Case 1. the logical channel triggering the SR has a dedicated SR configuration on an unchanged BWP, and the logical channel triggering the SR has a dedicated SR configuration on the changed BWP.

For case 1, the terminal can perform the SR through a dedicated scheduling request resource in following ways:

After SR prohibit timers corresponding to the logical channel triggering the SR expire, if the SR triggered by the logical channel is in a suspended state, the terminal performs the SR through the dedicated scheduling request resource on the changed BWP.

In this case, the terminal continues to run the SR prohibit timers after the BWP is changed, and after the SR prohibit timers corresponding to the logical channel triggering the SR expire, if the SR triggered by the logical channel is in the suspended state, the terminal performs the SR through the dedicated scheduling request resource on the changed BWP.

Case 2: the logical channel triggering the SR does not have a dedicated SR configuration on BWP used before BWP switching, and the logical channel triggering the SR has a dedicated SR configuration on the changed BWP.

For case 2, the terminal may perform the SR through a random access process or perform the SR through a dedicated scheduling request resource in one of following ways:

1. the terminal does not change the BWP, continues to perform the SR through the random access process on the BWP used before BWP switching, and then switches the BWP after random access succeeds.

According to the embodiment of the present application, the terminal does not switch the BWP after receiving a command for switching a BWP, but continues to perform the SR through the random access process on the BWP used before BWP switching.

2. the terminal does not change BWP, continues to perform the SR through the random access process on the a BWP used before BWP switching, switches the BWP when the $N^{th}$ random access fails, and performs the SR through the dedicated scheduling request resource on the changed BWP, where N is not greater than the maximum transmitting time of random access.

According to the embodiment of the present application, the terminal does not switch the BWP after receiving a command for switching a BWP, but continues to perform the SR through the random access process on the BWP used before BWP switching, switches the BWP after the $N^{th}$ random access fails, and performs the SR on the changed BWP through the dedicated scheduling request resource.

The value of N can be set as required herein. For example, N can be set to 1, as long as the first random access fails before the BWP changes, the BWP is switched, and the SR is performed on the changed BWP through the dedicated scheduling request resource.

3. the terminal immediately stops performing the SR through the random access process on the BWP used before BWP switching, immediately changes the BWP, and performs the SR on the changed BWP through the dedicated scheduling request resource.

According to the embodiment of the present application, the terminal immediately stops performing the SR through the random access process after receiving a command for switching a BWP, changes the BWP, and performs the SR through the dedicated scheduling request resource on the changed BWP.

Optionally, after a number of times of failures in random access is equal to the maximum transmitting time of random access, the terminal does not transmit a random access problem indication to a higher layer.

Based on the same inventive concept, the embodiments of the present application provide a terminal. Since the principle of the terminal to solve a problem is similar to that of the method for performing the SR in the embodiment of the present application, implementation of the terminal may refer to implementation of the method, and the repetition is not detailed here.

Figure 2:
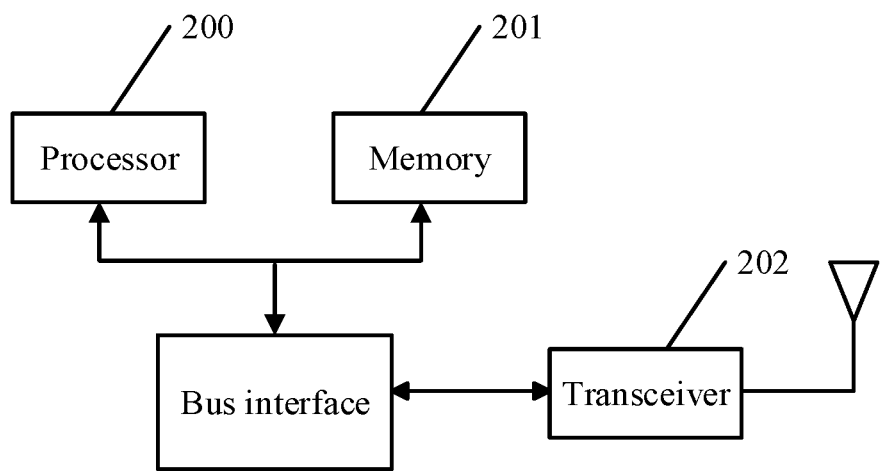
FIG. 2 illustrates a schematic structural diagram of a first terminal according to an embodiment of the present application.

As shown in FIG. 2, a first terminal in the embodiment of the present application includes: a processor 200, a memory 201 and a transceiver 202.

The processor 200 is responsible for managing a bus architecture and general processing, the memory 201 can store data used by the processor 200 during performing the operation, and the transceiver 202 is configured to receive and transmit data under control of the processor 200.

The bus architecture may include any number of interconnected buses and bridges, and is specifically formed by connecting various circuits of one or more processors represented by the processor 200 and memories represented by the memory 201. The bus architecture can also be formed by connecting various other circuits such as peripheral devices, voltage regulators and power management circuits, which are well known in the art, and therefore will not be further described herein. A bus interface provides an interface. The processor 200 is responsible for managing the bus architecture and general processing, and the memory 201 can store the data used by the processor 200 during performing the operation.

A process disclosed in the embodiment of the present application may be applied to the processor 200 or implemented by the processor 200. In an implementation process, all steps of a signal processing flow may be completed by an integrated logic circuit of hardware in the processor 200 or instructions in a form of software. The processor 200 may be a general-purpose processor, a digital signal processor, an application-specific integrated circuit, a field programmable gate array or other programmable logic devices, a discrete gate or transistor logic device or a discrete hardware component, and may implement or execute the methods, steps and logical block diagrams disclosed in the embodiments of the present application. The general-purpose processor may be a microprocessor or any conventional processor. The steps of the method disclosed in conjunction with the embodiments of the present application may be directly embodied to be executed and completed by a hardware processor, or may be executed and completed by a combination of hardware and software modules in the processor. The software module may be located in a mature storage medium in the art, such as a random memory, a flash memory, a read-only memory, a programmable read-only memory, or an electrically erasable programmable memory and a register. The storage medium is located in the memory 201, the processor 200 reads information in the memory 201, and the steps of the signal processing flow are completed in combination with the hardware.

The processor 200 is configured to read a program in the memory 201 and perform following processes:

determining that a BWP changes during a process of reporting the SR; and performing the SR according to an SR configuration on the changed BWP.

Optionally, the processor 200 is specifically configured to:
perform the SR through a random access process when a logical channel triggering the SR does not have a dedicated SR configuration on the changed BWP; or perform the SR through a random access process or a dedicated scheduling request resource, when a logical channel triggering the SR has a dedicated SR configuration on the changed BWP.

Optionally, the logical channel triggering the SR has a dedicated SR configuration on a BWP used before BWP switching, and the logical channel triggering the SR does not have the dedicated SR configuration on the changed BWP; and the processor 200 is specifically configured to:
when at least one SR prohibit timer is running, perform the SR through the random access process on the changed BWP and cancel all of suspended SRs, after a target SR prohibit timer in the at least one SR prohibit timer expires; or stop all of currently running SR prohibit timers after receiving a command for switching a BWP, perform the SR through the random access process on the changed BWP, and cancel all of suspended SRs; or stop all of currently running SR prohibit timers after receiving a command for switching a BWP, set SR counters related to the SR prohibit timers to a preset value, perform the SR through the random access process on the changed BWP, and cancel all of suspended SRs.

Optionally, the target SR prohibit timer is a first expired SR prohibit timer or a last expired SR prohibit timer.

Optionally, the processor 200 is also configured to:
when at least one SR prohibit timer is running, stop all of SR prohibit timers, and set SR counters corresponding to the at least one SR prohibit timer to a preset value.

Optionally, the logical channel triggering the SR does not have a dedicated SR configuration on a BWP used before BWP switching, and the logical channel triggering the SR also does not have the dedicated SR configuration on the changed BWP; and the processor 200 is specifically configured to:
not change the BWP, continue to perform the SR through the random access process on the BWP used before BWP switching, change the BWP after random access succeeds, or change the BWP after a $N^{th}$ random access fails, and continue to perform the SR through the random access process on the changed BWP, where N is not greater than a maximum transmitting time of random access; or stop performing the SR through the random access process on the BWP used before BWP switching, change the BWP, and perform the SR through the random access process on the changed BWP.

Optionally, the logical channel triggering the SR has a dedicated SR configuration on a BWP used before BWP switching, and the logical channel triggering the SR has the dedicated SR configuration on the changed BWP; and the processor 200 is specifically configured to:
after SR prohibit timers corresponding to the logical channel triggering the SR expire, perform the SR through the dedicated scheduling request resource on the changed BWP, when the SR triggered by the logical channel is in a suspended state.

Optionally, the logical channel triggering the SR does not have a dedicated SR configuration on a BWP used before BWP switching, and the logical channel triggering the SR has the dedicated SR configuration on the changed BWP; and the processor 200 is specifically configured to:
not change the BWP, continue to perform the SR through the random access process on the BWP used before BWP switching, switch the BWP after random access succeeds, or switch the BWP after a $N^{th}$ random access fails, and perform the SR through the dedicated scheduling request resource on the changed BWP, where N is not greater than a maximum transmitting time of random access; or stop performing the SR through the random access process on the BWP used before BWP switching, change the BWP, and perform the SR through the dedicated scheduling request resource on the changed BWP.

Optionally, the processor 200 is further configured to:

not transmit a random access problem indication to a higher layer, after a number of times of failures in random access is equal to a maximum transmitting time of random access.

Figure 3:
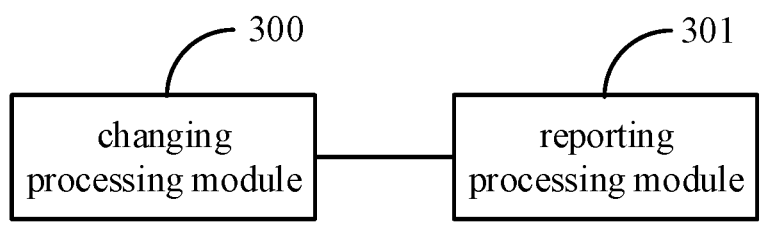
FIG. 3 illustrates a schematic structural diagram of a second terminal according to an embodiment of the present application.

As shown in FIG. 3, a second terminal of the embodiment of the present application includes:

a changing processing module 300, configured to determine that a BWP changes during a process of reporting the SR; and a reporting processing module 301, configured to perform the SR according to an SR configuration on the changed BWP.

Optionally, the reporting processing module 301 is specifically configured to:

perform the SR through a random access process when a logical channel triggering the SR does not have a dedicated SR configuration on the changed BWP; or perform the SR through a random access process or a dedicated scheduling request resource, when a logical channel triggering the SR has a dedicated SR configuration on the changed BWP.

Optionally, the logical channel triggering the SR has a dedicated SR configuration on a BWP used before BWP switching, and the logical channel triggering the SR does not have the dedicated SR configuration on the changed BWP; and the reporting processing module 301 is specifically configured to:

when at least one SR prohibit timer is running, perform the SR through the random access process on the changed BWP and cancel all of suspended SRs, after a target SR prohibit timer in the at least one SR prohibit timer expires; or stop all of currently running SR prohibit timers after receiving a command for switching a BWP, perform the SR through the random access process on the changed BWP, and cancel all of suspended SRs; or stop all of currently running SR prohibit timers after receiving a command for switching a BWP, set SR counters related to the SR prohibit timers to a preset value, perform the SR through the random access process on the changed BWP, and cancel all of suspended SRs.

Optionally, the target SR prohibit timer is a first expired SR prohibit timer or a last expired SR prohibit timer.

Optionally, the reporting processing module 301 is also configured to:

when at least one SR prohibit timer is running, stop all of SR prohibit timers, and set SR counters corresponding to the at least one SR prohibit timer to a preset value.

Optionally, the logical channel triggering the SR does not have a dedicated SR configuration on a BWP used before BWP switching, and the logical channel triggering the SR also does not have the dedicated SR configuration on the changed BWP; and the reporting processing module 301 is specifically configured to:

not change the BWP, continue to perform the SR through the random access process on the BWP used before BWP switching, change the BWP after random access succeeds, or change the BWP after a $N^{th}$ random access fails, and continue to perform the SR through the random access process on the changed BWP, where N is not greater than a maximum transmitting time of random access; or stop performing the SR through the random access process on the BWP used before BWP switching, change the BWP, and perform the SR through the random access process on the changed BWP.

Optionally, the logical channel triggering the SR has a dedicated SR configuration on a BWP used before BWP switching, and the logical channel triggering the SR has the dedicated SR configuration on the changed BWP; and the reporting processing module 301 is specifically configured to:

after SR prohibit timers corresponding to the logical channel triggering the SR expire, perform the SR through the dedicated scheduling request resource on the changed BWP, when the SR triggered by the logical channel is in a suspended state.

Optionally, the logical channel triggering the SR does not has a dedicated SR configuration on a BWP used before BWP switching, and the logical channel triggering the SR has the dedicated SR configuration on the changed BWP; and the reporting processing module 301 is specifically configured to:

not change the BWP, continue to perform the SR through the random access process on the BWP used before BWP switching, switch the BWP after random access succeeds, or switch the BWP after a $N^{th}$ random access fails, and perform the SR through the dedicated scheduling request resource on the changed BWP, where N is not greater than a maximum transmitting time of random access; or stop performing the SR through the random access process on the BWP used before BWP switching, change the BWP, and perform the SR through the dedicated scheduling request resource on the changed BWP.

Optionally, the reporting processing module 301 is also configured to:

not transmit a random access problem indication to a higher layer, after a number of times of failures in random access is equal to a maximum transmitting time of random access.

Embodiments of the present application provide a readable storage medium. The readable storage medium is a non-volatile readable storage medium and includes a program code. When the program code runs on a computing device, the program code is configured to enable the computing device to perform an operation of the terminal performing a scheduling request.

A few examples are given here to explain the solution of the present application.

Assuming that the terminal supports a BWP 1 and a BWP 2, a logical channel 1 of the terminal is a logical channel triggering the SR, the logical channel 1 has a dedicated SR configuration on the BWP 1, and the logical channel 1 does not have a dedicated SR configuration on the BWP 2.

Figure 4:
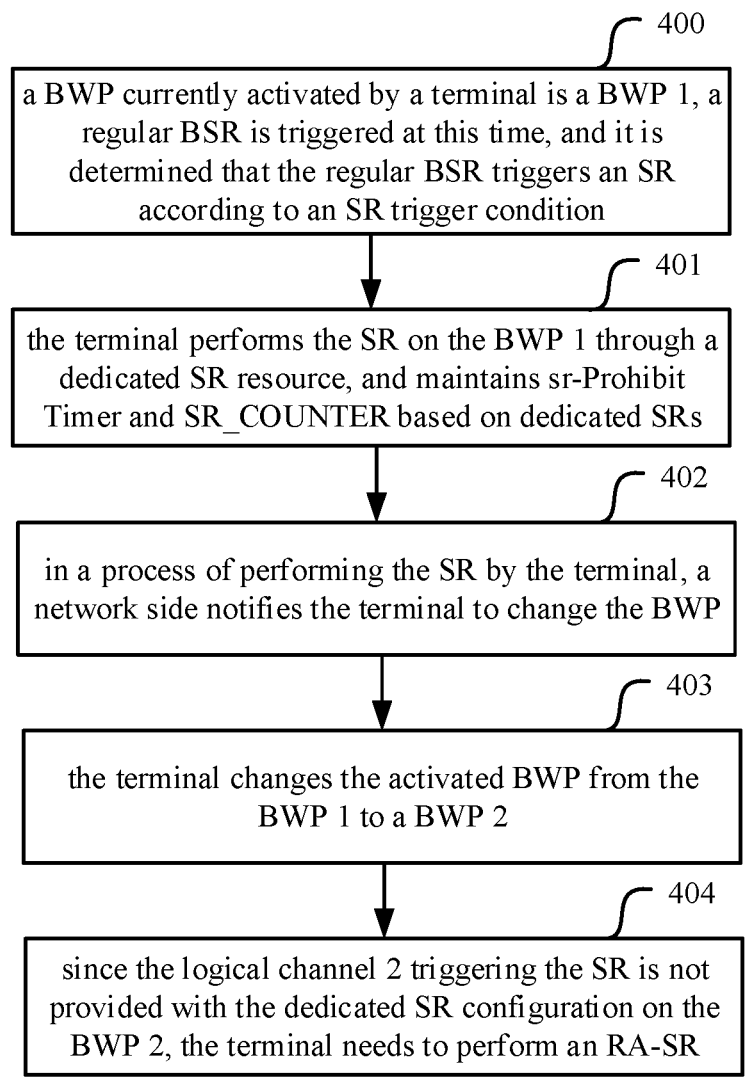
FIG. 4 illustrates a schematic flow diagram of a method for performing a SR with a dedicated SR configuration before changing and without the dedicated SR configuration after changing according to the embodiment of the present application.

Embodiment 1: as shown in FIG. 4, a method for performing a scheduling request with a dedicated SR configuration before changing and without the dedicated SR configuration after changing according to the embodiment of the present application includes:

Step 400: a BWP currently activated by a terminal is a BWP 1, a regular BSR is triggered at this time, and it is determined that the regular BSR triggers an SR according to an SR trigger condition.

Step 401: since a logical channel 1 triggering the SR has a dedicated SR configuration on the BWP 1, the terminal performs the SR on the BWP 1 through a dedicated SR resource, and maintains sr-Prohibit Timer and SR_COUNTER based on dedicated SRs.

Step 402: in a process of performing the SR by the terminal, a network side notifies the terminal to change the BWP.

Step 403: the terminal changes the activated BWP from the BWP 1 to a BWP 2.

Step 404: since the logical channel 2 triggering the SR is not provided with the dedicated SR configuration on the BWP 2, the terminal needs to perform an RA-SR.

Optionally, the terminal specifically operates following steps:

1. if at least one SR prohibit timer of the terminal is running, after a target SR prohibit timer in the running SR prohibit timers expires, the terminal performs the SR through a random access process on the changed BWP and cancels all of suspended SRs.

2. after receiving a command for switching a BWP, the terminal immediately stops all of currently running SR prohibit timers, performs the SR through the random access process on the changed BWP and cancels all of suspended SRs.

3. after receiving a command for switching a BWP, the terminal immediately stops all of currently running SR prohibit timers, sets SR counters related to the SR prohibit timers to a preset value, performs the SR through the random access process on the changed BWP and cancels all of suspended SRs.

Figure 5:
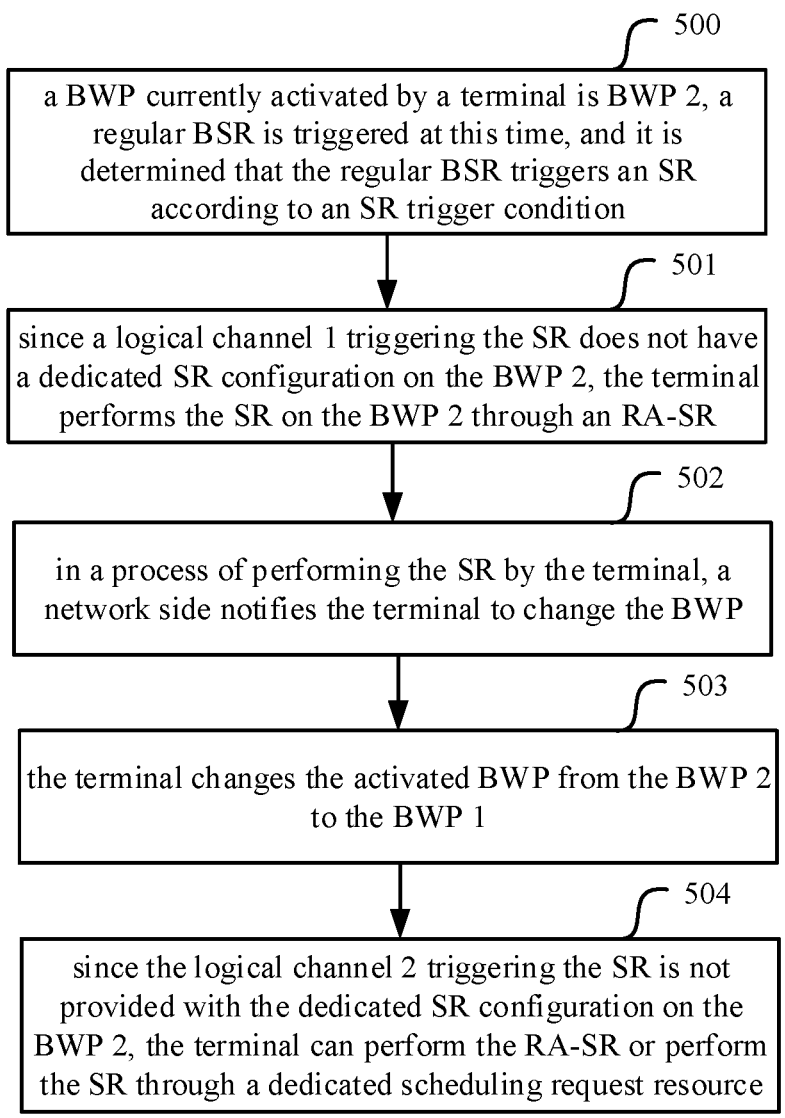
FIG. 5 illustrates a schematic flow diagram of a method for performing a SR without a dedicated SR configuration before changing and with the dedicated SR configuration after changing according to the embodiment of the present application.

Embodiment 2: as shown in FIG. 5, a method for performing a scheduling request without a dedicated SR configuration before changing and with the dedicated SR configuration after changing according to the embodiment of the present application includes:

Step 500: a BWP currently activated by a terminal is BWP 2, a regular BSR is triggered at this time, and it is determined that the regular BSR triggers an SR according to an SR trigger condition.

Step 501: since a logical channel 1 triggering the SR does not have a dedicated SR configuration on the BWP 2, the terminal performs the SR on the BWP 2 through an RA-SR.

Step 502: in a process of performing the SR by the terminal, a network side notifies the terminal to change the BWP.

Step 503: the terminal changes the activated BWP from the BWP 2 to the BWP 1.

Step 504: since the logical channel 2 triggering the SR is not provided with the dedicated SR configuration on the BWP 2, the terminal can perform the RA-SR or perform the SR through a dedicated scheduling request resource (namely D-SR).

Optionally, the terminal specifically operates in any of following steps:

1. the terminal does not change the BWP, continues to perform the SR through the random access process on the BWP used before BWP switching, switches the BWP after random access succeeds, or switches the BWP after the $N^{th}$ random access fails, and performs the SR through a dedicated scheduling request resource on the changed BWP, where N is not greater than the maximum transmitting time of random access.

2. the terminal stops performing the SR through the random access process on the BWP used before BWP switching immediately, changes the BWP immediately, and performs the SR through a dedicated scheduling request resource on the changed BWP.

Those skilled in the art should understand that the embodiments of the present application may be provided as methods, systems or computer program products. Therefore, the present application may take the form of a full hardware embodiment, a full software embodiment or an embodiment combining software with hardware. Moreover, the present application may take the form of a computer program product implemented on one or more computer usable storage media (including but not limited to a disk storage, a CD-ROM and an optical storage) containing computer usable program codes.

The present application is described with reference to flowcharts and/or block diagrams of methods, devices (systems) and computer program products according to embodiments of the present application. It should be understood that each flow and/or block in the flowcharts and/or block diagrams and a combination of the flows and/or blocks in the flowcharts and/or block diagrams may be implemented by computer program instructions. These computer program instructions can be supplied to a general-purpose computer, a special-purpose computer, an embedded processing machine or a processor of other programmable data processing apparatus to produce a machine, and therefore devices for implementing functions specified in one or more flows in the flowcharts and/or one or more blocks in the block diagrams are produced through instructions executed by the computer or the processor of other programmable data processing apparatus.

These computer program instructions may also be stored in a computer readable memory which can guide the computer or other programmable data processing apparatus to operate in a specific manner, so that the instructions stored in the computer readable memory produce a manufactured material including an instruction device, and the instruction device implements the functions specified in the one or more flows in the flowcharts and/or the one or more blocks in the block diagrams.

These computer program instructions can also be loaded onto the computer or other programmable data processing apparatus, so that a series of operating steps are performed on the computer or other programmable apparatus to achieve computer-implemented processing, and then instructions executed on the computer or other programmable device thus provide steps for implementing the functions specified in the one or more flows in the flowcharts and/or the one or more blocks in the block diagrams.

Although the preferred embodiments of the present application have been described, those skilled in the art can make additional variations and modifications to these embodiments once they learn a basic inventive concept. Therefore, the appended claims are intended to be interpreted as including the preferred embodiments and all variations and modifications falling within the scope of the present application.

Obviously, those skilled in the art can make various modifications and variations to the embodiments of the present application without departing from the spirit and scope of the embodiments of the present application. In this way, if these modifications and variations of the embodiments of the present application fall within the scope of the claims of the present application and equivalent technologies, the present application is also intended to include these modifications and variations.

What is claimed is:

1. A non-transitory computer storage medium, on which a computer program is stored, wherein when the computer program is executed by a processor of a terminal, causes the processor to implement:
    determining, by the terminal, that a band width part (BWP) changes during a process of reporting a scheduling request (SR); and
    performing, by the terminal, the SR according to an SR configuration on the changed BWP;
    wherein said performing, by the terminal, the SR according to the SR configuration on the changed BWP comprises:
    performing, by the terminal, the SR through a random access process, when a logical channel triggering the SR does not have a dedicated SR configuration on the changed BWP; or
    performing, by the terminal, the SR through a dedicated scheduling request resource, when a logical channel triggering the SR has a dedicated SR configuration on the changed BWP;
    wherein when the logical channel triggering the SR has a dedicated SR configuration on a BWP used before BWP switching, and the logical channel triggering the SR does not have the dedicated SR configuration on the changed BWP, performing, by the terminal, the SR through the random access process comprises:
    when at least one SR prohibit timer of the terminal is running, performing, by the terminal, the SR through the random access process on the changed BWP and canceling, by the terminal, all of suspended SRs, after a target SR prohibit timer in the at least one SR prohibit timer expires, or stopping, by the terminal after receiving a command for switching a BWP, all of currently running SR prohibit timers, performing, by the terminal, the SR through the random access process on the changed BWP, and canceling, by the terminal, all of suspended SRs; or stopping, by the terminal after receiving a command for switching a BWP, all of currently running SR prohibit timers, setting, by the terminal, SR counters related to the SR prohibit timers to a preset value, performing, by the terminal, the SR through the random access process on the changed BWP, and canceling, by the terminal, all of suspended SRs;
    wherein when the logical channel triggering the SR does not have a dedicated SR configuration on a BWP used before BWP switching, and the logical channel triggering the SR has the dedicated SR configuration on the changed BWP, performing, by the terminal, the SR through the dedicated SR resource comprises:
    not changing, by the terminal, the BWP, continuing to perform the SR through the random access process on the BWP used before BWP switching, switching, by the terminal, the BWP after random access succeeds; or
    switching, by the terminal, the BWP after a $N^{th}$ random access fails; and
    performing, by the terminal, the SR through the dedicated scheduling request resource on the changed BWP, wherein N is not greater than a maximum transmitting time of random access.

2. The non-transitory computer storage medium of claim 1, wherein the target SR prohibit timer is a first expired SR prohibit timer or a last expired SR prohibit timer.

3. The non-transitory computer storage medium of claim 1, wherein after canceling, by the terminal, all of the suspended SRs, the processor is caused to implement:
    when at least one SR prohibit timer is running, stopping, by the terminal, all of SR prohibit timers, and setting, by the terminal, SR counters corresponding to the at least one SR prohibit timer to a preset value.

4. The non-transitory computer storage medium of claim 1, wherein when the logical channel triggering the SR does not have a dedicated SR configuration on a BWP used before BWP switching, and the logical channel triggering the SR also does not have the dedicated SR configuration on the changed BWP, performing, by the terminal, the SR through the random access process comprises:
    not changing, by the terminal, the BWP, continuing to perform the SR through the random access process on the BWP used before BWP switching, changing, by the terminal, the BWP after random access succeeds, or changing, by the terminal, the BWP after a $N^{th}$ random access fails, and continuing to perform, by the terminal, the SR through the random access process on the changed BWP, wherein N is not greater than a maximum transmitting time of random access; or
    stopping performing, by the terminal, the SR through the random access process on the BWP used before BWP switching, changing, by the terminal, the BWP, and performing, by the terminal, the SR through the random access process on the changed BWP.

5. The non-transitory computer storage medium of claim 1, wherein when the logical channel triggering the SR has a dedicated SR configuration on a BWP used before BWP switching, and the logical channel triggering the SR has the dedicated SR configuration on the changed BWP, performing, by the terminal, the SR through the random access process comprises:
    after SR prohibit timers corresponding to the logical channel triggering the SR expire, performing, by the terminal, the SR through the dedicated scheduling request resource on the changed BWP, when the SR triggered by the logical channel is in a suspended state.

6. The non-transitory computer storage medium of claim 1, wherein the processor is caused to implement:
    after a number of times of failures in random access is equal to a maximum transmitting time of random access, not transmitting, by the terminal, a random access problem indication to a higher layer.

7. A terminal for performing a scheduling request (SR), wherein the terminal comprises: a processor, a memory and a transceiver; and
    the processor is configured to read a program in the memory and perform following processes:
    determining that a band width part (BWP) changes during a process of reporting the SR; and performing the SR according to an SR configuration on the changed BWP;
    wherein the processor is specifically configured to:
    perform the SR through a random access process when a logical channel triggering the SR does not have a dedicated SR configuration on the changed BWP; or
    perform the SR through a dedicated scheduling request resource, when a logical channel triggering the SR has a dedicated SR configuration on the changed BWP;
    wherein the logical channel triggering the SR has a dedicated SR configuration on a BWP used before BWP switching, and the logical channel triggering the SR does not have the dedicated SR configuration on the changed BWP; and the processor is specifically configured to: when at least one SR prohibit timer is running, perform the SR through the random access process on the changed BWP and cancel all of suspended SRs, after a target SR prohibit timer in the at least one SR prohibit timer expires; or stop all of currently running SR prohibit timers after receiving a command for switching a BWP, perform the SR through the random access process on the changed BWP, and cancel all of suspended SRs; or stop all of currently running SR prohibit timers after receiving a command for switching a BWP, set SR counters related to the SR prohibit timers to a preset value, perform the SR through the random access process on the changed BWP, and cancel all of suspended SRs;

wherein the logical channel triggering the SR does not have a dedicated SR configuration on a BWP used before BWP switching, and the logical channel triggering the SR has the dedicated SR configuration on the changed BWP; and the processor is specifically configured to:

not change the BWP, continue to perform the SR through the random access process on the BWP used before BWP switching, switch the BWP after random access succeeds; or switch the BWP after a $N^{th}$ random access fails; and perform the SR through the dedicated scheduling request resource on the changed BWP, wherein N is not greater than a maximum transmitting time of random access.

8. The terminal according to claim 7, wherein the target SR prohibit timer is a first expired SR prohibit timer or a last expired SR prohibit timer.

9. The terminal according to claim 7, wherein the processor is further configured to:

when at least one SR prohibit timer is running, stop all of SR prohibit timers, and set SR counters corresponding to the at least one SR prohibit timer to a preset value.

10. The terminal according to claim 7, wherein the logical channel triggering the SR does not have a dedicated SR configuration on a BWP used before BWP switching, and the logical channel triggering the SR also does not have the dedicated SR configuration on the changed BWP; and the processor is specifically configured to:

not change the BWP, continue to perform the SR through the random access process on the BWP used before BWP switching, change the BWP after random access succeeds, or change the BWP after a $N^{th}$ random access fails, and continue to perform the SR through the random access process on the changed BWP, wherein N is not greater than a maximum transmitting time of random access; or stop performing the SR through the random access process on the BWP used before BWP switching, change the BWP, and perform the SR through the random access process on the changed BWP.

11. The terminal according to claim 7, wherein the logical channel triggering the SR has a dedicated SR configuration on a BWP used before BWP switching, and the logical channel triggering the SR has the dedicated SR configuration on the changed BWP; and the processor is specifically configured to:

after SR prohibit timers corresponding to the logical channel triggering the SR expire, perform the SR through the dedicated scheduling request resource on the changed BWP, when the SR triggered by the logical channel is in a suspended state.

12. The terminal according to claim 7, wherein the processor is further configured to:

not transmit a random access problem indication to a higher layer, after a number of times of failures in random access is equal to a maximum transmitting time of random access.

* * * * *